United States Patent
Kim et al.

(10) Patent No.: US 12,476,312 B2
(45) Date of Patent: Nov. 18, 2025

(54) SECONDARY BATTERY

(71) Applicant: LG Energy Solution, Ltd., Seoul (KR)

(72) Inventors: Sang-Hun Kim, Daejeon (KR);
Dae-Woong Song, Daejeon (KR);
Min-Hyeong Kang, Daejeon (KR);
Hyung-Kyun Yu, Daejeon (KR);
Hun-Hee Lim, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 880 days.

(21) Appl. No.: 17/719,876

(22) Filed: Apr. 13, 2022

(65) Prior Publication Data

US 2022/0336898 A1  Oct. 20, 2022

(30) Foreign Application Priority Data

Apr. 15, 2021  (KR) .................. 10-2021-0049365
Dec. 29, 2021  (KR) .................. 10-2021-0191701

(51) Int. Cl.
*H01M 50/186*  (2021.01)
*H01M 50/193*  (2021.01)
*H01M 50/342*  (2021.01)

(52) U.S. Cl.
CPC ....... *H01M 50/186* (2021.01); *H01M 50/193* (2021.01); *H01M 50/342* (2021.01)

(58) Field of Classification Search
CPC ............ H01M 50/186; H01M 50/193; H01M 50/342; H01M 50/375; H01M 50/105;

(Continued)

(56) References Cited

U.S. PATENT DOCUMENTS 5,874,513 A   2/1999   Watanabe et al.
7,095,769 B2  8/2006   Yoon et al.
(Continued)

FOREIGN PATENT DOCUMENTS

EP   3112151 A1   1/2017
EP   3916830 A1   12/2021
(Continued)

OTHER PUBLICATIONS

International Search Report for Application No. PCT/KR2022/005441 mailed Aug. 5, 2022, pp. 1-3.
(Continued)

*Primary Examiner* — Basia A Ridley
*Assistant Examiner* — Heng M. Chan
(74) *Attorney, Agent, or Firm* — Lerner David LLP

(57) ABSTRACT

Disclosed herein is a secondary battery having a vent member. The secondary battery may include an electrode assembly, a case including an accommodation portion to receive the electrode assembly, an electrode lead attached to the electrode assembly and a vent member. The case may include a sealing portion to seal the electrode assembly therein. The sealing portion may include a sealant resin to form a seal around the electrode assembly. The electrode lead may extend away from the case along a first direction. The sealing portion may include an inclined sealing portion adjacent the electrode lead. The inclined sealing portion may extend along a second direction. The second direction may be non-orthogonal to the first direction. The vent member may be disposed in the inclined sealing portion. The vent member may include a vent resin having a lower melting point than the sealant resin.

34 Claims, 12 Drawing Sheets

(58) Field of Classification Search
CPC ......... H01M 50/3425; H01M 2200/10; H01M 50/178

See application file for complete search history.

(56) References Cited

U.S. PATENT DOCUMENTS

| | | | |
|---|---|---|---|
| 7,122,276 | B2 | 10/2006 | Gu |
| 8,546,499 | B2 | 10/2013 | Garroff et al. |
| 8,597,775 | B2 | 12/2013 | Rhee et al. |
| 2003/0148173 | A1 | 8/2003 | Gu |
| 2004/0038126 | A1 | 2/2004 | Gu |
| 2004/0048149 | A1* | 3/2004 | Gross ............... H01M 50/202 |
| | | | 429/185 |
| 2008/0213659 | A1 | 9/2008 | Yamada |
| 2009/0311583 | A1 | 12/2009 | Wu |
| 2011/0104468 | A1 | 5/2011 | Rhee et al. |
| 2011/0104527 | A1 | 5/2011 | Choi et al. |
| 2011/0274955 | A1 | 11/2011 | Park et al. |
| 2012/0053308 | A1* | 3/2012 | Garroff ............. C08F 210/16 |
| | | | 526/124.7 |
| 2012/0231307 | A1 | 9/2012 | Ha |
| 2013/0011722 | A1* | 1/2013 | Ahn .................. H01M 50/30 |
| | | | 429/179 |
| 2013/0143077 | A1 | 6/2013 | Yebka et al. |
| 2014/0030564 | A1 | 1/2014 | Lee |
| 2016/0020434 | A1 | 1/2016 | Kwon et al. |
| 2016/0226042 | A1 | 8/2016 | Hartmann et al. |
| 2017/0244082 | A1 | 8/2017 | Ahn et al. |
| 2018/0026291 | A1 | 1/2018 | Okada |
| 2018/0114964 | A1 | 4/2018 | Kim et al. |
| 2020/0058973 | A1 | 2/2020 | Golubkov |
| 2020/0067029 | A1 | 2/2020 | Park et al. |
| 2020/0220191 | A1 | 7/2020 | Okada et al. |
| 2020/0251707 | A1 | 8/2020 | Han et al. |
| 2020/0321577 | A1 | 10/2020 | Kim et al. |
| 2021/0257696 | A1 | 8/2021 | Mochizuki et al. |
| 2021/0288383 | A1 | 9/2021 | Hong et al. |
| 2021/0351463 | A1 | 11/2021 | Park et al. |

FOREIGN PATENT DOCUMENTS

| | | |
|---|---|---|
| JP | H06049808 A | 2/1994 |
| JP | 2001-072788 A | 3/2001 |
| JP | 2001093489 A | 4/2001 |
| JP | 2001-273884 A | 10/2001 |
| JP | 2001-283800 A | 10/2001 |
| JP | 2003242952 A | 8/2003 |
| JP | 2007265738 A | 10/2007 |
| JP | 2008130370 A | 6/2008 |
| JP | 2008192451 A | 8/2008 |
| JP | 2010086753 A | 4/2010 |
| JP | 2010244865 A | 10/2010 |
| JP | 2010251151 A | 11/2010 |
| JP | 2011-524822 A | 9/2011 |
| JP | 2013118186 A | 6/2013 |
| JP | 2013522844 A | 6/2013 |
| JP | 2016081705 A | 5/2016 |
| JP | 2017062872 A | 3/2017 |
| JP | 2018018582 A | 2/2018 |
| JP | 2018-525804 A | 9/2018 |
| JP | 2019-142018 A | 8/2019 |
| JP | 2019207781 A | 12/2019 |
| JP | 2020534650 A | 11/2020 |
| KR | 100372475 B1 | 5/2003 |
| KR | 20030066895 A | 8/2003 |
| KR | 20040017094 A | 2/2004 |
| KR | 20050010001 A | 1/2005 |
| KR | 2006-0035885 A | 4/2006 |
| KR | 20080036257 A | 4/2008 |
| KR | 20090064041 A | 6/2009 |
| KR | 20110107448 A | 10/2011 |
| KR | 20110131259 A | 12/2011 |
| KR | 101245284 B1 | 3/2013 |
| KR | 101264527 B1 | 5/2013 |
| KR | 20130048419 A | 5/2013 |
| KR | 20140015769 A | 2/2014 |
| KR | 101452945 B1 | 10/2014 |
| KR | 2015-0055775 A | 5/2015 |
| KR | 20150121914 A | 10/2015 |
| KR | 20150134304 A | 12/2015 |
| KR | 101614185 B1 | 4/2016 |
| KR | 101653305 B1 | 9/2016 |
| KR | 20160118585 A | 10/2016 |
| KR | 20170020996 A | 2/2017 |
| KR | 20170103236 A | 9/2017 |
| KR | 101959134 B1 | 3/2019 |
| KR | 20190023648 A | 3/2019 |
| KR | 20190047104 A | 5/2019 |
| KR | 20190123059 A | 10/2019 |
| KR | 102159368 B1 | 9/2020 |
| KR | 20200114784 A | 10/2020 |
| WO | 2015129426 A1 | 9/2015 |

OTHER PUBLICATIONS

International Search Report for Application No. PCT/KR2022/005504 mailed Jul. 27, 2022, pp. 1-4.
EESR for Application No. 22788512.6 dated Mar. 12, 2024. 9 pgs.
International Search Report for PCT/KR2022/005500 mailed Jul. 25, 2022. 3 pgs.
Extended European Search Report including Written Opinion for Application No. 22788482.2 dated Jan. 15, 2025. 9 pages.

* cited by examiner

SECONDARY BATTERY

CROSS-REFERENCE TO RELATED APPLICATIONS

The present application claims priority to Korean Patent Application No. 10-2021-0049365 filed on Apr. 15, 2021, and Korean Patent Application No. 10-2021-0191701 filed on Dec. 29, 2021, the disclosures of which are incorporated herein by reference in their entirety.

TECHNICAL FIELD

The present disclosure relates to a secondary battery, and more particularly, to a secondary battery having a vent member.

BACKGROUND ART

Secondary batteries which are highly applicable to various products and exhibit superior electrical properties such as high energy density, etc. Secondary batteries are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like.

The secondary battery generally has a structure in which an electrode assembly including at least one unit cell having a positive electrode/separator/negative electrode structure is accommodated in a battery case of a laminate sheet in which an outer layer, a metal barrier layer and a sealant layer are sequentially laminated, and a sealant resin of the sealant layer is fused to seal the electrode assembly is sealed.

In the conventional secondary battery, the battery may ignite due to various causes such as a short circuit inside the secondary battery, overcharge or overdischarge, temperature control, or the like. At this time, thermal propagation where the temperature inside the secondary battery rises rapidly and simultaneously the heat is transferred to neighboring cells may be generated, which may further increase the fire.

In order to minimize damage to the electrode caused by gas when thermal propagation occurs—i.e., when the internal temperature of the secondary battery rises, directional venting characteristic is required to discharge the gas in one direction. However, the conventional secondary battery has a problem in that it is difficult to induce gas discharge in a specific direction.

BRIEF SUMMARY OF THE INVENTION

Disclosed herein are secondary batteries with vent members.

In accordance with an aspect of the present disclosure, a secondary battery is provided. A secondary battery according to this aspect, may include an electrode an electrode assembly, a case including an accommodation portion to receive the electrode assembly, an electrode lead attached to the electrode assembly and a vent member. The case may include a sealing portion to seal the electrode assembly therein. The sealing portion may include a sealant resin to form a seal around the electrode assembly. The electrode lead may extend away from the case along a first direction. The sealing portion may include an inclined sealing portion adjacent the electrode lead. The inclined sealing portion may extend along a second direction. The second direction may be non-orthogonal to the first direction. The vent member may be disposed in the inclined sealing portion. The vent member may include a resin (hereinafter referred to as a "vent resin") having a lower melting point than the sealant resin.

Continuing in accordance with this aspect, the inclined sealing portion may have an inclination angle of 10° to 80°. The inclination angle may be defined as an angle between the first direction and the second direction. The vent member may include a first side extending parallel to the second direction. A vent may form along a direction perpendicular to the first side of the vent member.

Continuing in accordance with this aspect, the secondary battery may include a lead film surrounding an outer surface of the electrode lead. The lead film may be interposed between the electrode lead and the sealing portion. The vent member may extend through the accommodation portion such that the vent member may at least partially overlap or contact the lead film in the accommodation portion.

Continuing in accordance with this aspect, the vent member may include a first portion and a second portion. The first portion of the vent member may extend along the second direction such that the first portion may at least partially overlap or contact the lead film in the accommodation portion. The second portion may extend along a third direction orthogonal to the second direction. The vent member may define an L shape. The second portion may include a tapered edge that extends into the accommodation space along the electrode assembly. An outer end of the first portion may be spaced apart from an inner end of the sealing portion adjacent the lead film. The outer end of the first portion may be located in the accommodation portion. The second portion may not overlap or contact the lead film. An area of a region of the vent member overlapping or contacting the lead film may be 1% to 30% of an area of a region of the lead film not contacting or overlapping the electrode lead.

Continuing in accordance with this aspect, a width of the vent member may vary in a direction perpendicular to the second direction.

Continuing in accordance with this aspect, the vent member may define any of a circular, oval, stepped, triangular and quadrilateral shape.

Continuing in accordance with this aspect, a thickness of the vent member may vary in a direction perpendicular to the second direction.

Continuing in accordance with this aspect, the vent resin may include a linear low-density polyethylene having a comonomer with a carbon number of 6 or more. The linear low-density polyethylene may be polymerized in the presence of a metallocene catalyst. A content of the comonomer with a carbon number of 6 or more may be 15 weight % or less based on 100 weight % of the linear low-density polyethylene. A content of the comonomer with the carbon number of 6 or more may be from 5 weight % to 15 weight % based on 100 weight % of the linear low-density polyethylene.

Continuing in accordance with this aspect, the vent member may melt at 100° C. to 120° C. to vent gases from the accommodation portion to an exterior of the secondary battery. The vent member may vent gases from the accommodation portion when the accommodation portion is at a pressure of 0.7 atm or above.

Continuing in accordance with this aspect, the vent member may have a maximum sealing strength of less than 6 kgf/15 mm at 100° C. or above.

Continuing in accordance with this aspect, the vent member may have an average sealing strength of less than 4.5 kgf/15 mm at 100° C. or above.

Continuing in accordance with this aspect, the vent member may have a maximum sealing strength of 6 kgf/15 mm or more at room temperature to 60° C.

Continuing in accordance with this aspect, the vent member may have an average sealing strength of 4.5 kgf/15 mm or more at room temperature to 60° C.

Continuing in accordance with this aspect, the vent resin may have a poly dispersity index (PDI) of 4 or less.

Continuing in accordance with this aspect, a difference between a crystallization temperature of the sealant resin and a crystallization temperature of the vent resin may be 10° C. or less. The vent resin may have a melting point of 100° C. to 130° C.

Continuing in accordance with this aspect, the vent resin may have a weight-average molecular weight of 100,000 g/mol to 400,000 g/mol.

Continuing in accordance with this aspect, the secondary battery may be a pouch-type secondary battery.

Continuing in accordance with this aspect, the vent member may have a maximum sealing strength of less than 6 kgf/15 mm at 100° C. to 120° C.

Continuing in accordance with this aspect, the vent member may have an average sealing strength of less than 4.5 kgf/15 mm at 100° C. to 120° C.

Continuing in accordance with this aspect, the vent member may have a maximum sealing strength of less than 3 kgf/15 mm at 120° C. or more.

Continuing in accordance with this aspect, the vent member may have an average sealing strength of less than 2 kgf/15 mm at 120° C. or more.

In accordance with another aspect of the present disclosure, a secondary battery is provided. A secondary battery according to this aspect, may include an electrode assembly, an electrode lead, a case, and a vent member. The case may include an accommodation portion to receive the electrode assembly and a sealing portion to seal the electrode assembly therein. The sealing portion may include a sealant resin to form a seal around the electrode assembly. The electrode lead may be attached to the electrode assembly. The electrode lead may extend away from the case along a first direction. The sealing portion may include a quadrilateral sealing portion adjacent the electrode lead. At least one side of the quadrilateral sealing portion may extend along a second direction. The second direction may be nonparallel to the first direction. The vent member may be disposed at least partially in the quadrilateral sealing portion. The vent member may include a vent resin having a lower melting point than the sealant resin.

In accordance with another aspect of the present disclosure, a secondary battery is provided. A secondary battery according to this aspect, may include an electrode assembly, an electrode lead, a case and a vent member. The case may include an accommodation portion to receive the electrode assembly and a sealing portion to seal the electrode assembly therein. The sealing portion may include a sealant resin to form a seal around the electrode assembly. The electrode lead may be attached to the electrode assembly. The electrode lead may extend away from the case along a first direction. The sealing portion may include a convex sealing portion adjacent the electrode lead. The convex sealing portion may extend along a convex curve from the first direction to a second direction. The second direction may be orthogonal to the first direction. The vent member may be disposed in the convex sealing portion. The vent member may include a vent resin having a lower melting point than the sealant resin.

In accordance with another aspect of the present disclosure, a secondary battery is provided. A secondary battery according to this aspect, may include an electrode assembly, an electrode lead, a case and a vent member. The case may include an accommodation portion to receive the electrode assembly and a sealing portion to seal the electrode assembly therein. The sealing portion may include a sealant resin to form a seal around the electrode assembly. The electrode lead may be attached to the electrode assembly. The electrode lead may extend away from the case along a first direction. The sealing portion may include a concave sealing portion adjacent the electrode lead. The concave sealing portion may extend along a concave curve from a second direction toward the first direction. The second direction may be orthogonal to the first direction. The vent member may be disposed in the concave sealing portion. The vent member may include a vent resin having a lower melting point than the sealant resin.

In accordance with another aspect of the present disclosure, a secondary battery is provided. A secondary battery according to this aspect, may include an electrode assembly, an electrode lead, a case and a vent member. The case may include an accommodation portion to receive the electrode assembly and a sealing portion to seal the electrode assembly therein. The sealing portion may include a sealant resin to form a seal around the electrode assembly. The electrode lead may be attached to the electrode assembly. The electrode lead may extend away from the case in first direction. The sealing portion may include a first sealing portion and a second sealing portion. The first and second sealing portions may be defined by a seal along an outer circumference of the accommodation portion. The second sealing portion may be disposed between adjacent sides of the first sealing portion. An exterior side of the second sealing portion may be defined by a line or a curve joining the adjacent sides of the first sealing portion. The line may be nonparallel to the first direction. The second sealing portion may include the vent member containing a vent resin having a lower melting point than the sealant resin.

Since the secondary battery according to an embodiment of the present disclosure includes a vent member containing a vent resin having a lower melting point than the sealant resin of the sealing portion, gas discharge may be induced toward the vent member.

Since the secondary battery according to an embodiment of the present disclosure includes the vent member in an inclined sealing portion, it is possible to minimize the amount of gas vented to directly contact the electrode lead, thereby improving the safety of the battery.

Since the secondary battery according to an embodiment of the present disclosure includes the vent member in the inclined sealing portion, gas may be discharged easily, compared to the case where the vent member is provided in a straight sealing portion.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings shown herein.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The electrode lead is a component whose temperature rises rapidly in abnormal situations such as overcharge or internal short circuit. Therefore, if the direct contact between the vented gas and the electrode lead is minimized, safety may be improved.

Figure 1:
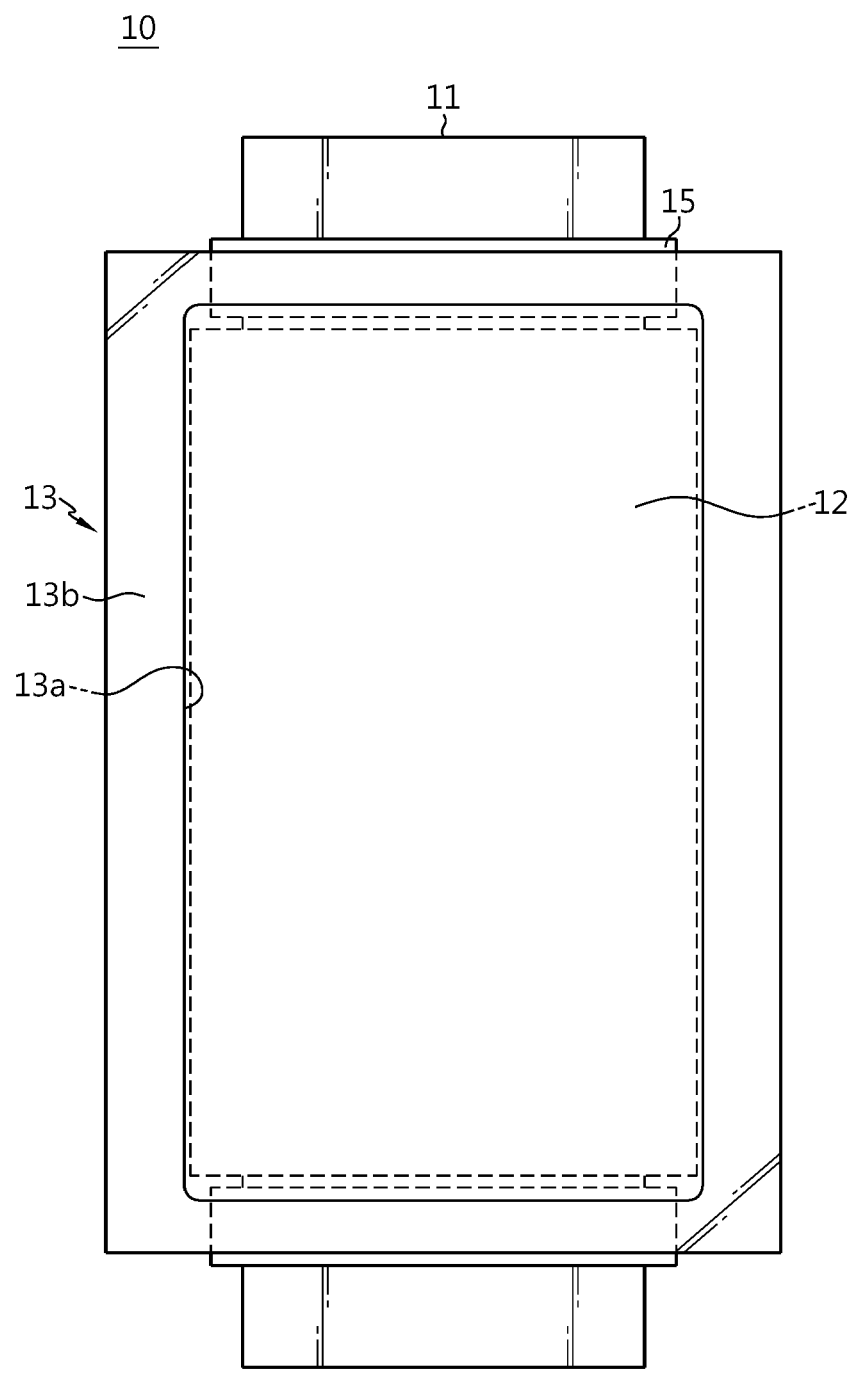
FIG. 1 is a plan view showing a conventional secondary battery.

FIG. 1 is a plan view showing a conventional secondary battery. Referring to FIG. 1, in the conventional secondary battery, the case has a rectangular shape, and the sealing portion formed along an outer circumferential surface of the case does not form an inclination, so a first side and a second side of adjacent sealing portions at the corner of the sealing portions may withstand the pressure caused by the swelling of the battery, and thus it is not easy to induce the gas to be discharged toward the sealing portion corner where direct contact of the gas to be discharged with the electrode lead can be minimized.

The inventors of the present disclosure have completed the present disclosure by finding that if an inclined sealing portion is provided at the corner of the sealing portion and a vent member is inserted to be at least partially overlapped with the inclined sealing portion, a vent may be easily generated at the sealing portion corner.

A secondary battery according to an embodiment of the present disclosure includes an electrode assembly to which an electrode lead is attached; a case including an accommodation portion for accommodating the electrode assembly and a sealing portion containing a sealant resin and formed to seal the electrode assembly; wherein the sealing portion includes an inclined sealing portion at a corner thereof, and a vent member containing a resin having a lower melting point than the sealant resin is included in the inclined sealing portion.

The term "inclined sealing portion" may refer to a region formed between an outer inclined sealing line of the sealing portion and an inner inclined sealing line of the sealing portion in some embodiments disclosed herein. The outer inclined sealing line is away from the electrode assembly and the inner inclined sealing line is closer to the electrode assembly.

The term "inclination" may refer to some embodiments where the inclined sealing portion forms an acute angle, or an obtuse angle (second direction) with respect to a direction of the electrode lead (first direction)—i.e., a non-orthogonal angle with respect to a direction of the electrode lead.

Throughout this specification, including a vent member in the inclined sealing portion means that the inclined sealing portion and the vent member may be at least partially overlapped.

In describing preferred embodiments of the disclosure, reference will be made to directional nomenclature used in describing the secondary battery. It is noted that this nomenclature is used only for convenience and that it is not intended to be limiting with respect to the scope of the present disclosure.

Figure 2:
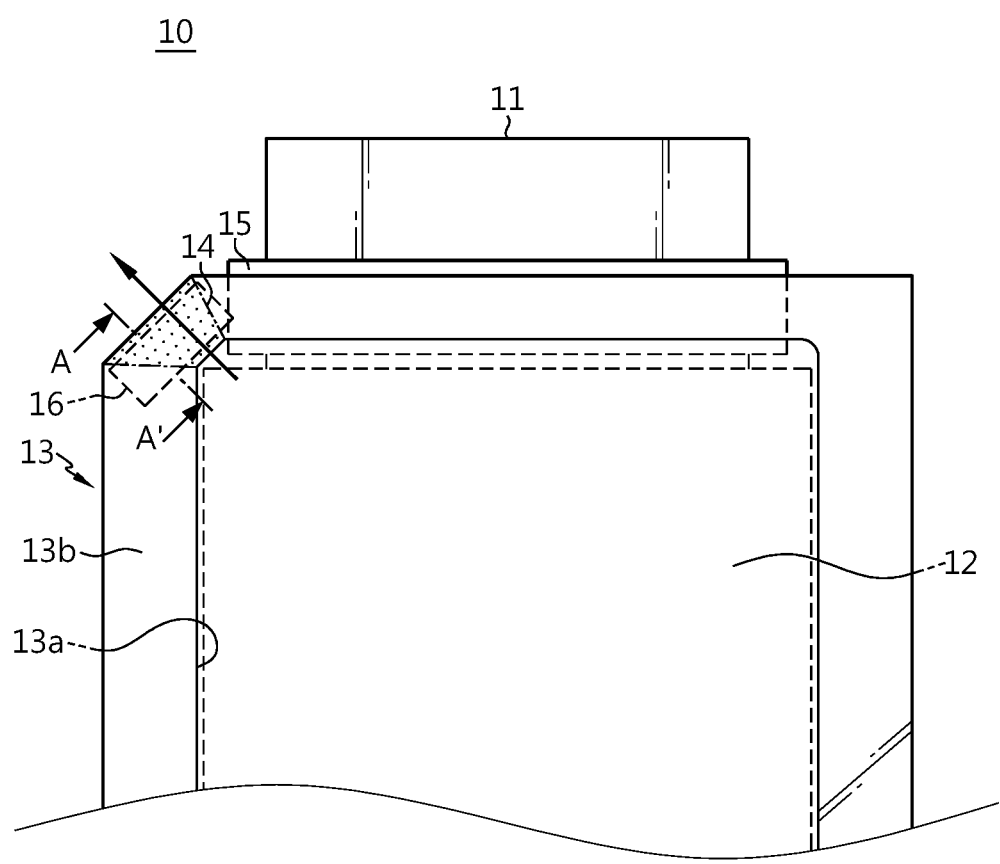
FIG. 2 is a partial plan view of a secondary battery according to an embodiment of the present disclosure.

FIG. 2 shows a secondary battery 10 according to an embodiment of the present disclosure. Referring to FIG. 2, secondary battery 10 includes an electrode assembly 12 to which an electrode lead 11 is attached, and a case 13. Electrode assembly 12 may include a positive electrode plate, a negative electrode plate and a separator (not shown). The positive electrode plate and the negative electrode plate may be sequentially laminated with a separator being interposed therebetween in electrode assembly 12.

The positive electrode plate may include a positive electrode current collector made of a metal thin film having excellent conductivity, for example an aluminum (Al) foil, and a positive electrode active material layer coated on at least one surface thereof. In addition, the positive electrode plate may include a positive electrode tab made of a metal material, for example an aluminum (Al) material, at one side end thereof. The positive electrode tab may protrude from one side end of the positive electrode plate, be welded to one side end of the positive electrode plate, or be bonded thereto using a conductive adhesive.

The negative electrode plate may include a negative electrode current collector made of a conductive metal thin film, for example a copper (Cu) foil, and a negative electrode active material layer coated on at least one surface thereof. In addition, the negative electrode plate may include a negative electrode tab formed of a metal material, for example a copper (Cu) or nickel (Ni) material, at one side end thereof. The negative electrode tab may protrude from one side end of the negative electrode plate, be welded to one side end of the negative electrode plate, or be bonded thereto using a conductive adhesive.

The separator is interposed between the positive electrode plate and the negative electrode plate to electrically insulate the positive electrode plate and the negative electrode plate from each other, and may be formed in a porous membrane form so that lithium ions can pass between the positive electrode plate and the negative electrode plate. The separator may include, for example, a porous membrane using polyethylene (PE), or polypropylene (PP), or a composite film thereof.

An inorganic coating layer may be provided on the surface of the separator. The inorganic coating layer may have a structure in which inorganic particles are bonded to each other by a binder to form an interstitial volume between the particles.

Electrode assembly 12 may be a jelly-roll (winding-type) electrode assembly having a structure in which long sheet-type positive and negative electrodes are wound with a separator being interposed therebetween, a stacked (stack-type) electrode assembly having a structure in which a plurality of positive and negative electrodes cut into units of a predetermined size are sequentially stacked with a separator being interposed therebetween, a stack/folding type electrode assembly having a structure in which bi-cells or full-cells where positive and negative electrodes of a predetermined unit are stacked with a separator being interposed therebetween are wound, or the like.

Referring to FIG. 2, case 13 may include an accommodation portion 13a for accommodating the electrode assembly 12, and a sealing portion 13b containing a sealant resin and formed to seal the electrode assembly 12.

Sealing portion 13b refers to a portion that is fused along the outer circumferential surface of the accommodation portion 13a to seal electrode assembly 12 as shown in FIG. 2. Sealing portion 13b includes an inclined sealing portion 14 at a corner of case 13 adjacent to an electrode lead 11 extending from the battery case. Secondary battery 10 may include a lead film 15. Lead film 15 may surround at least a portion of an outer surface of the electrode lead 11 as shown in FIG. 2. Lead film 15 may be interposed between electrode lead 11 and sealing portion 13b of the case 13 in a region where the electrode lead 11 protrudes away from the battery case to help binding of the electrode lead 11 and the sealing portion 13b of the battery case 13.

A vent member 16 is provided in the inclined sealing portion 14 as shown in FIG. 2. Specifically, at least a part of the vent member 16 may be overlapped or lie within the inclined sealing portion 14. The vent member 16 contains a vent resin having a lower melting point than the sealant resin of the sealing portion 13b.

Since the vent member 16 contains the vent resin having a lower melting point than the sealant resin of the sealing portion 13b, the vent member 16 melts before the sealant resin at high temperature. The sealing strength of the portion where the vent member 16 is inserted is further lowered compared to the sealing strength of the case portion containing the sealant resin at high temperature, so that the venting characteristic may be readily implemented. Accordingly, when thermal propagation occurs, it is possible to improve the safety of the battery by inducing the gas to be discharged in a specific direction.

Figure 3:
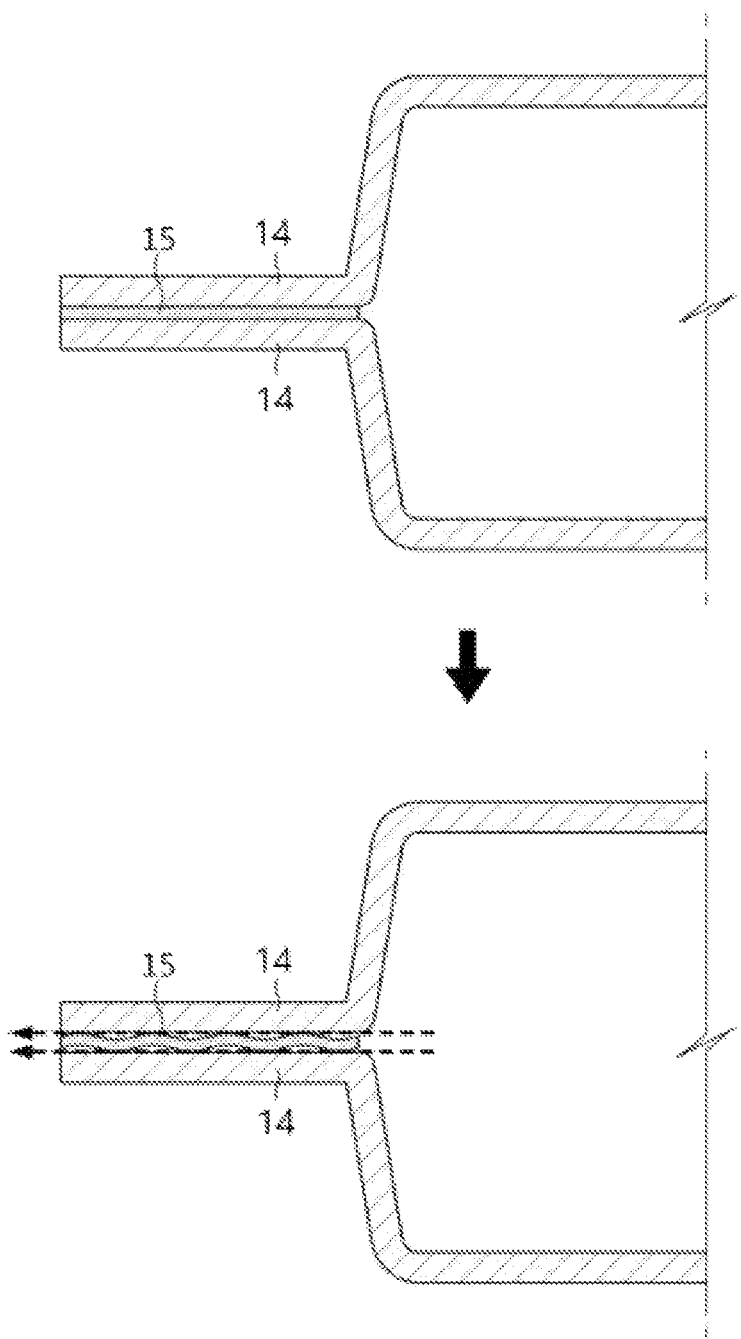
FIG. 3 is a schematic drawing showing vent formation in a secondary battery according to an embodiment of the present disclosure.

FIG. 3 is a schematic diagram showing a state in which a vent occurs in the secondary battery according to an embodiment of the present invention. Specifically, FIG. 3 is a cross-sectional view showing the vent member in the secondary battery according to an embodiment of the present invention.

Referring to FIG. 3, at a temperature at which the battery normally operates, the vent member 16 seals the case 13 from the outside. If the temperature of the battery is rises due to abnormal operation of the battery, the sealing strength of the portion into which the vent member 16 is inserted is reduced as the vent member 16 melts. Accordingly, as the sealing strength of the portion into which the vent member 16 is inserted is lowered, a vent may be formed in this location to guide and exhaust gases from the accommodation portion. For example, as the pressure of the gas inside the battery is concentrated at the interface of the vent member 16 and the inclined sealing portion 14, a vent or gap is formed between the vent member 16 and the inclined sealing portion 14 to exhaust gases.

The vent member 16 and the inclined sealing portion 14 may be overlapped or connected to each other by thermal fusion or other means. In another example, the vent member 16 and the inclined sealing portion 14 may be overlapped or connected to each other through an adhesive such as glue or other similar means. In another example, the vent member 16 and the inclined sealing portion 14 may be physically coupled to each other through a clip or the like. In another example, a part of the vent member 16 may be embedded in a film constituting the inclined sealing portion 14.

Since the vent member 16 is located in the inclined sealing portion 14 to minimize the amount of gas vented to directly contact the electrode lead 11, namely toward a side portion of the electrode lead 11, it is possible to further improve the safety of the battery.

In addition, since the vent member 16 is located in the inclined sealing portion 14, namely an inner end of the inclined sealing portion 14 is inclined, an area where the inner end of the inclined sealing portion 14 is exposed to the accommodation portion 13a is smaller than the adjacent sealing portions 13b which form orthogonal corners. Accordingly, the pressure applied while the battery swells may be concentrated on the inclined sealing portion 14 at the corner of the sealing portion more easily, and thus the gas may be induced more easily to be discharged toward the corner of the sealing portion. Here, the inner end of the inclined sealing portion 14 refers to an end of the inclined sealing portion 14 that is closer to the accommodation portion 13a.

Referring to FIG. 2, the inclined sealing portion may have an inclination angle of 10° to 80°, or 20° to 60°, or 40° to 50°. Here, the inclination angle refers to an angle between a first direction defined by the extending electrode lead and a second direction defined by a direction in which the inclined sealing portion extends. When the inclination angle of the inclined sealing portion satisfies the above-mentioned range, the amount of gas vented directly toward the electrode lead 11, namely toward a side portion of the electrode lead 11, may be further minimized, thereby further improving the safety of the battery. As shown by directional arrow representing the direction of gas exhaust from the secondary battery in FIG. 2, the exhaust gases are directed away from electrode lead 11.

Referring to FIG. 2, the vent member 16 may be parallel to the second direction. As shown in FIG. 2, the vent member 16 may include a first side extending parallel to the second direction and the second direction forms a non-orthogonal angle with respect to the first direction.

In an embodiment of the present disclosure, a vent may occur in a direction perpendicular to the direction of the vent member. A vent may form along a direction perpendicular to the first side of the vent member 16 as shown in FIG. 2. In this case, the amount of gas vented to directly contact the electrode lead 11, namely toward the side portion of the electrode lead 11, may be minimized, thereby further improving the safety of the battery.

In an embodiment of the present disclosure, the vent member 16 maybe located in the inclined sealing portion 14. In another embodiment of the present disclosure, the vent member 16 may be extend through the accommodation portion 13a. In another embodiment of the present disclosure, the vent member 16 may be located to be exposed out of the case 13 through the inclined sealing portion 14 (not shown).

In an embodiment of the present disclosure, the vent member 16 may not be overlapped with the lead film 15.

In another embodiment of the present disclosure, the vent member 16 may partially overlap lead film 15 as shown in FIG. 2. When the vent member 16 is at least partially overlapped with the lead film 15, it is easy to consistently and readily fix and locate the position of the vent member 16. The vent member 16 may extend through the accommodation portion 13a such that the vent member 16 at least partially overlaps or contacts the lead film 15 in the accommodation portion 13a. For example, when the vent member 16 is fused after being inserted, since as a part of the vent member 16 is overlapped with the lead film 15, the vent member 16 may be inserted at a predetermined position and then fused.

The vent member 16 may be positioned to be spaced apart from the electrode lead 11 by a predetermined distance. Accordingly, it is easier to minimize the amount of gas vented in a direction that may directly contact the electrode lead 11, namely toward the side portion of the electrode lead 11, thereby further improving the safety of the battery.

In an embodiment of the present disclosure, the vent member 16 may be spaced apart from the lead film 15 in the sealing portion 13b or 14, and the vent member 16 may be at least partially overlap or contact the lead film 15 in the accommodation portion 13a. As the vent member 16 does not overlap or contact the lead film 15 in the sealing portion 13b or 14—i.e., vent member 16 being located away from the electrode lead 11, the amount of gas vented toward the side portion of electrode lead 11 may be further minimized, thereby further improving safety of the battery.

In an embodiment of the present disclosure, the outer and inner sealing lines of the inclined sealing portion 14 may be formed by one or more straight lines. Referring to FIG. 2, the inclined sealing portion 14 may define a quadrilateral-shaped region formed by connecting ends of a linear sealing line inclined at the outer side of the inclined sealing portion and ends of a linear sealing line inclined at the inner side of the inclined sealing portion.

Referring to FIG. 2, the inclined sealing portion 14 may have an inclination angle of 10° to 80°, or 20° to 60°, or 40° to 50°. When the inclination angle of the inclined sealing portion 14 satisfies the above-mentioned range, it may be easier to induce the gas to be discharged in a direction that can minimize direct contact with the electrode lead.

Figure 9:
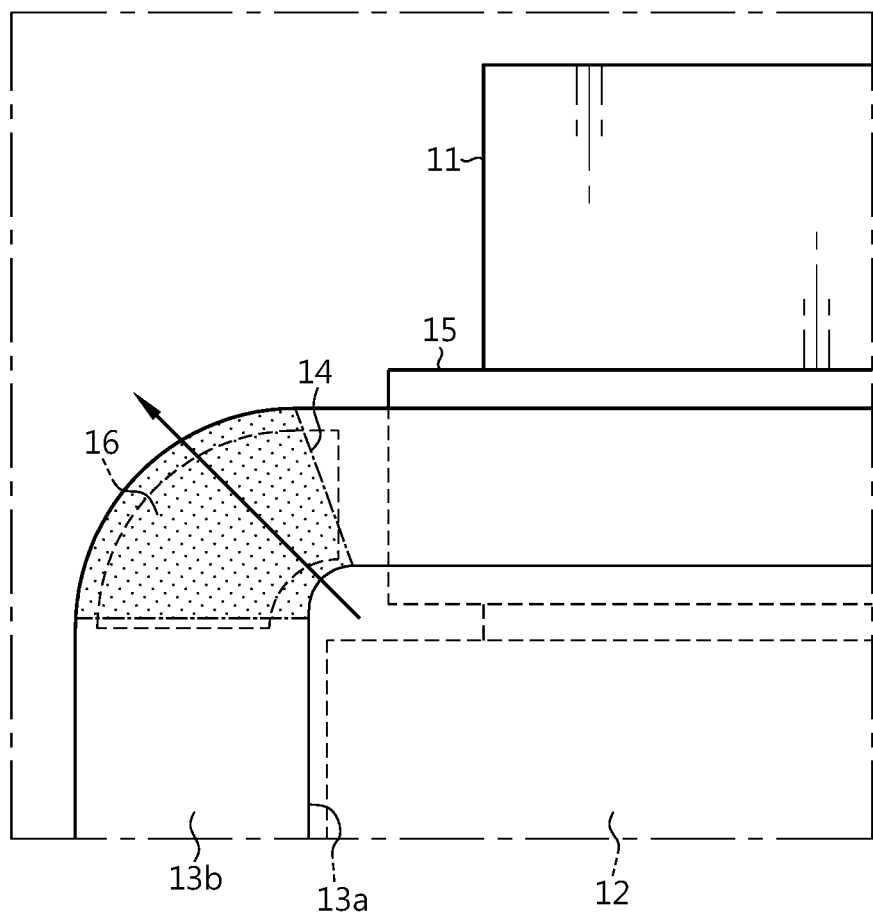
FIG. 9 is a partially enlarged plan view showing a convex sealing portion in a secondary battery according to another embodiment of the present disclosure.
Figure 10:
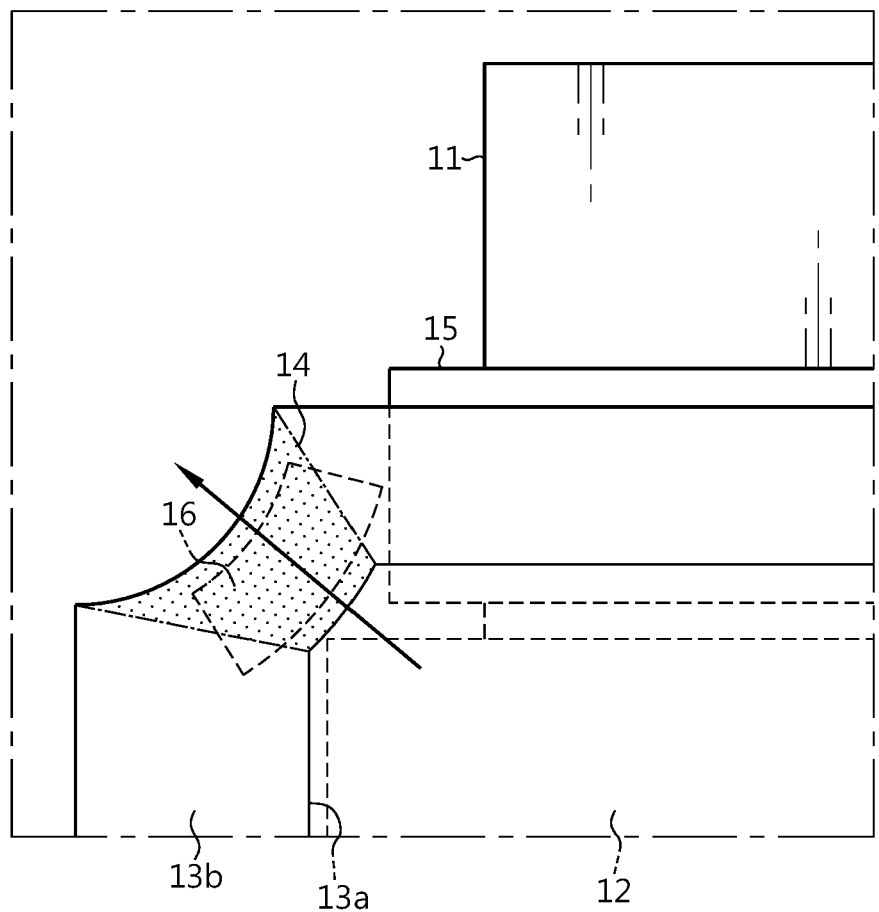
FIG. 10 is a partially enlarged plan view showing a concave sealing portion in a secondary battery according to another embodiment of the present disclosure.

In another embodiment of the present disclosure, the sealing portion may include a first sealing portion 13b and a second sealing portion 14. The first sealing portion 13b is a sealing portion that is sealed along the outer circumference of the accommodation portion. The second sealing portion 14 is disposed between adjacent sides of the first sealing portion 13b. The second sealing portion 14 is a sealing portion in which extension lines of two first sealing portions 13b adjacent to each other do not meet orthogonally with respect to the two first sealing portions but are connected with a straight line (ex. FIG. 2) or a curve (ex. FIGS. 9 and 10). Namely, an exterior side of the second sealing portion 14 may be defined by a line or a curve joining the adjacent sides of the first sealing portion 13b. The line may be nonparallel to the first direction. The second sealing portion 14 may include a vent member containing a resin ("vent resin") having a lower melting point than the sealant resin.

If the secondary battery according to an embodiment of the present disclosure includes the second sealing portion 14, since an inner end of the second sealing portion is inclined or curved, an area where the inner end of the second sealing portion is exposed to the accommodation portion is smaller than an area where the inner end of the adjacent sealing portions which form orthogonal corners is exposed to the accommodation portion, and accordingly, the pressure may be concentrated on the inner end of the second sealing portion more easily. Here, the inner end of the second sealing portion refers to an end of the second sealing portion that is closer to the accommodation portion.

Figure 4:
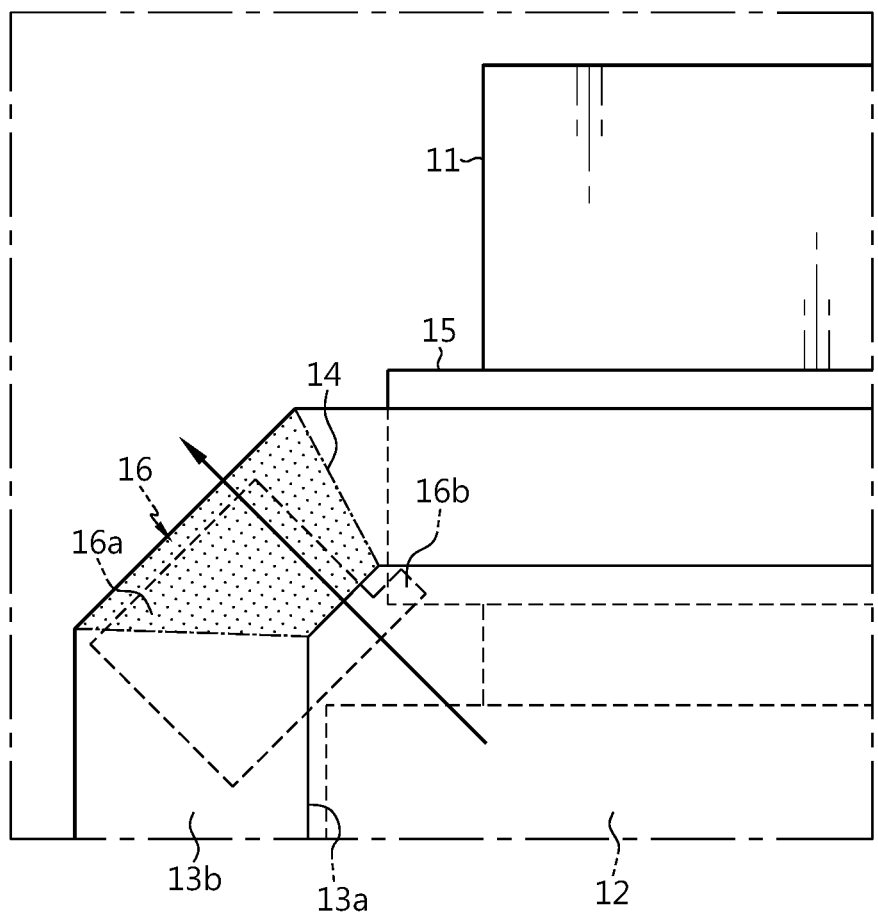
FIG. 4 is a partially enlarged plan view showing a lead film and a vent member of a secondary battery according to another embodiment of the present disclosure.

FIG. 4 is a partially enlarged view showing a vent member 16 in a secondary battery according to another embodiment of the present disclosure. Referring to FIG. 4, the vent member 16 may include a first portion 16b and a second portion 16a. The first portion 16b extends along the second direction between the lead film 15 and the second portion 16a thereby forming a bridge portion between the second portion and the lead film. Second portion 16a extends along a third direction orthogonal to the second direction.

In an embodiment of the present disclosure, the vent member 16 may have an L shape as shown in FIG. 4.

Here, a vent may occur substantially in the second portion 16a, and a vent may not substantially occur in the first portion 16b.

In an embodiment of the present disclosure, the first portion 16b may have a rectangular shape. For example, a long side may of the first portion be positioned in the third direction and a short side of the first portion may be positioned in the second direction.

In an embodiment of the present disclosure, the second portion 16a may have a rectangular shape. For example, a short side of the second portion may be positioned in the third direction and a long side of the second portion may be positioned in the second direction.

Referring to FIG. 4, the first portion 16b may at least partially overlap or contact the lead film 15. A part of the first portion 16b and a part of the lead film 15 may be overlapped or connected through thermal fusion. In another example, a part of the first portion 16b and a part of the lead film 15 may be overlapped or connected through an adhesive such as glue. In another example, a part of the first portion 16b and a part of the lead film 15 may be physically coupled to each other through a clip or the like. In another example, a part of the first portion 16b may be embedded in a film constituting the lead film 15.

The second portion 16a of the vent member 16 and the lead film 15 may not overlap or contact each other as shown in FIG. 4. For example, the second portion 16a and the lead film 15 may not be overlapped in the sealing portion 13*b* and/or inclined sealing portion 14. When the second portion 16*a* of the vent member 16 and the lead film 15 are not overlapped, the amount of gas vented toward the side portion of the electrode lead 11 may be further minimized, thereby further improving the safety of the battery.

In an embodiment of the present disclosure, the region where the vent member overlaps or contacts the lead film may be 1% to 30%, or 1.3% to 23%, or 1.5% to 12%, or 2% to 9% of the region where the lead film does not overlap the electrode lead. Here, the region where the lead film does not overlap the electrode lead refers to the sum of both regions of the electrode lead and the lead film that do not overlap. The outer end of the first portion 16*b* may be spaced apart from an inner end of the inclined sealing portion 14 as shown in FIG. 4. Here, the "outer end of the first portion of the vent member" refers to an end of the first portion 16*b* that is closer to the sealing portion. The "inner end of the inclined sealing portion" refers to an end of the inclined sealing portion that is farther from the outer direction of the battery. When the outer end of the first portion 16*b* is spaced apart from the inner end of the inclined sealing portion 14, the entire first portion 16*b* is located in the accommodation portion 13*a*. Accordingly, a gap or space between the first portion 16*b* and the inclined sealing portion 14 is exposed to the accommodation portion 13*a*, and as a result, the gas pressure is concentrated on the gap or space, thereby securing faster venting in an abnormal situation.

Figure 5:
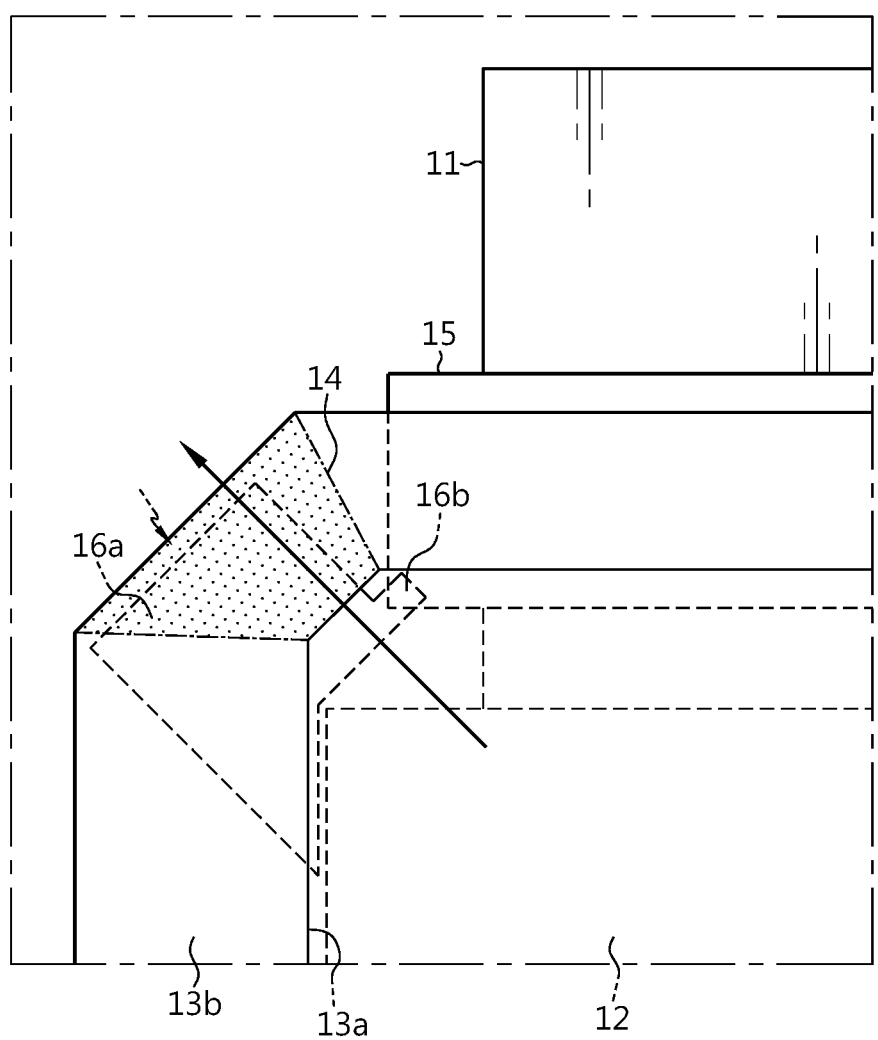
FIG. 5 is a partially enlarged plan view of a vent member in a secondary battery according to another embodiment of the present disclosure.

FIG. 5 is a partially enlarged view showing a vent member 16 in a secondary battery according to another embodiment of the present disclosure. Vent member 16 shown in FIG. 5 is generally similar to vent member 16 shown in FIG. 4. For example, vent member 16 may include a first portion 16*b* and a second portion 16*a* as shown in FIG. 5. However, second portion 16*b* of vent member 16 may include a tapered edge that extends into accommodation space 13*a* along electrode assembly 12 as best shown in FIG. 5. The tapered edge can be readily aligned with a side of the electrode assembly 12 to facilitate convenient and proper placement of the vent member within the battery case. It is easier to prevent the electrode assembly 12 inside the accommodation portion 13*a* from contacting the inner end of the second portion 16*a*.

Figure 6:
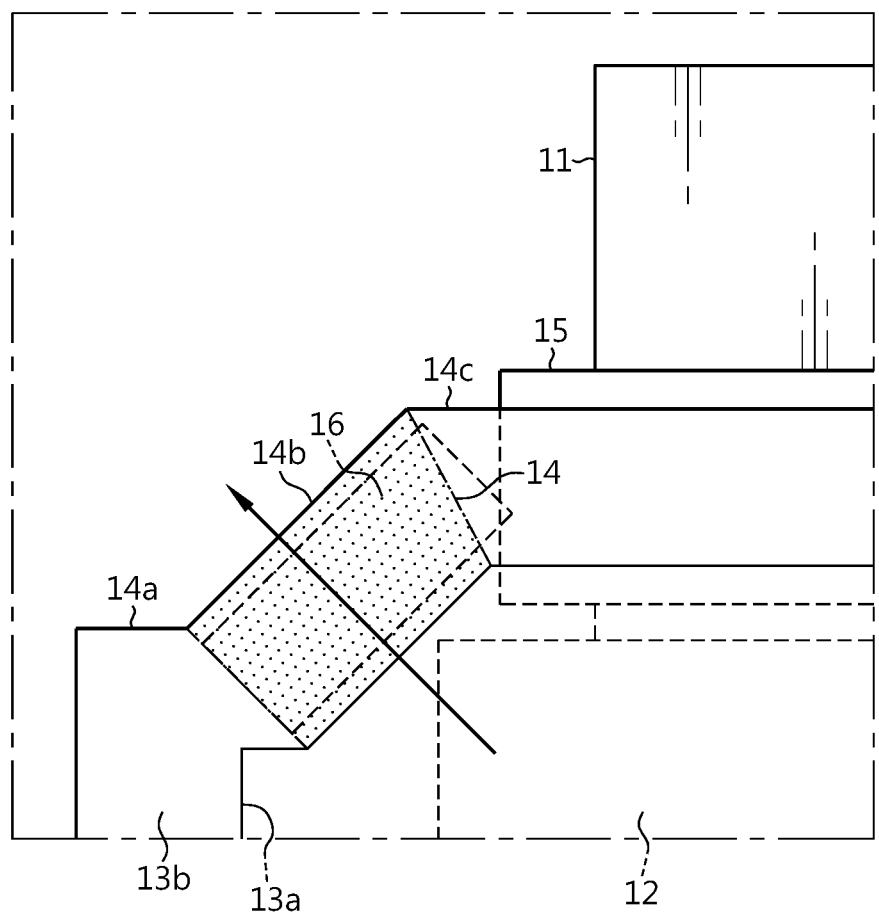
FIG. 6 is a partially enlarged plan view showing an inclined sealing portion in a secondary battery according to another embodiment of the present disclosure.

Referring to FIG. 6, the inclined sealing portion may define a quadrilateral region formed by connecting the ends of the linear sealing line inclined at the outer side of the sealing portion and the ends of the linear sealing line inclined at the inner side of the sealing portion.

Specifically, in a region where the outer sealing line may include a first linear portion 14*a* orthogonal to the first direction, an inclined portion 14*b* extending from the first linear portion 14*a* and inclined toward the electrode lead 11, and a second linear portion 14*c* extending from the inclined portion 14*b* and extending toward one end of the case 13 in contact with the lead film 15, a region formed by connecting one side end and the other side end of the inclined portion 14*b* to one side end and the other side end of the inclined portion of the inner sealing line, respectively, may be referred to as the inclined sealing portion.

The inclined sealing portion may have an inclination angle of 10° to 80°, or 20° to 60°, or 40° to 50°. When the inclination angle of the inclined sealing portion satisfies the above-mentioned range, the gas may be more easily induced to be discharged in a direction that can minimize direct contact with the electrode lead.

Figure 7:
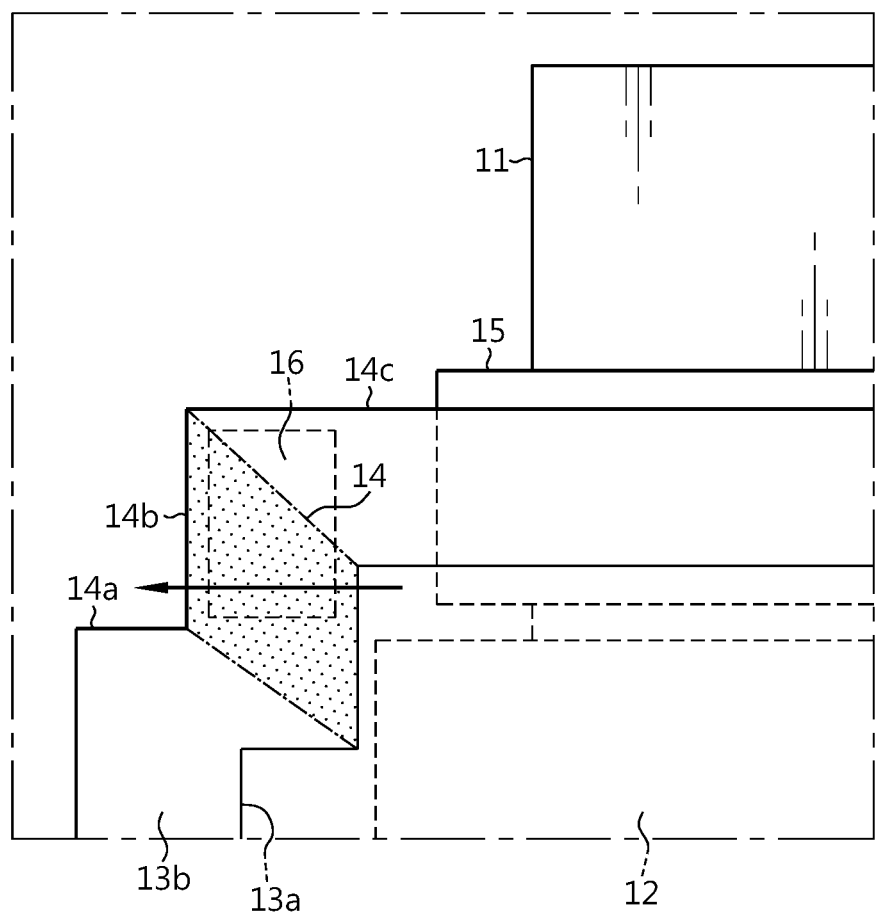
FIG. 7 is a partially enlarged plan view showing a quadrilateral sealing portion in a secondary battery according to another embodiment of the present disclosure.

Referring to FIG. 7, vent member 16 may be at least partially located within a quadrilateral sealing portion. The quadrilateral sealing portion may be defined by a quadrilateral region formed by connecting ends of a linear sealing line parallel with the first direction at the outer side of the sealing portion and ends of a linear sealing line parallel with the first direction at the inner side of the sealing portion as shown in FIG. 7.

Specifically, in a region where the outer sealing line may include a first linear portion 14*a* orthogonal to the first direction, a second linear portion 14*b* having a right angle to the first linear portion 14*a* and extending from the first linear portion 14*a*, and a third linear portion 14*c* having a right angle to the second linear portion 14*b* and extending from the second linear portion 14*b* to one end of the case 13 in contact with the lead film 15, a region formed by connecting one side end and the other side end of the second linear portion 14*b* to one side end and the other side end of the inner sealing line parallel to the first direction, respectively, may be referred to as the quadrilateral sealing portion.

Referring to FIG. 7, at least a part of the vent member 16 may lie within the quadrilateral sealing portion. Accordingly, the gas may be more easily induced to be discharged in a direction that can minimize direct contact with the electrode lead.

Figure 8:
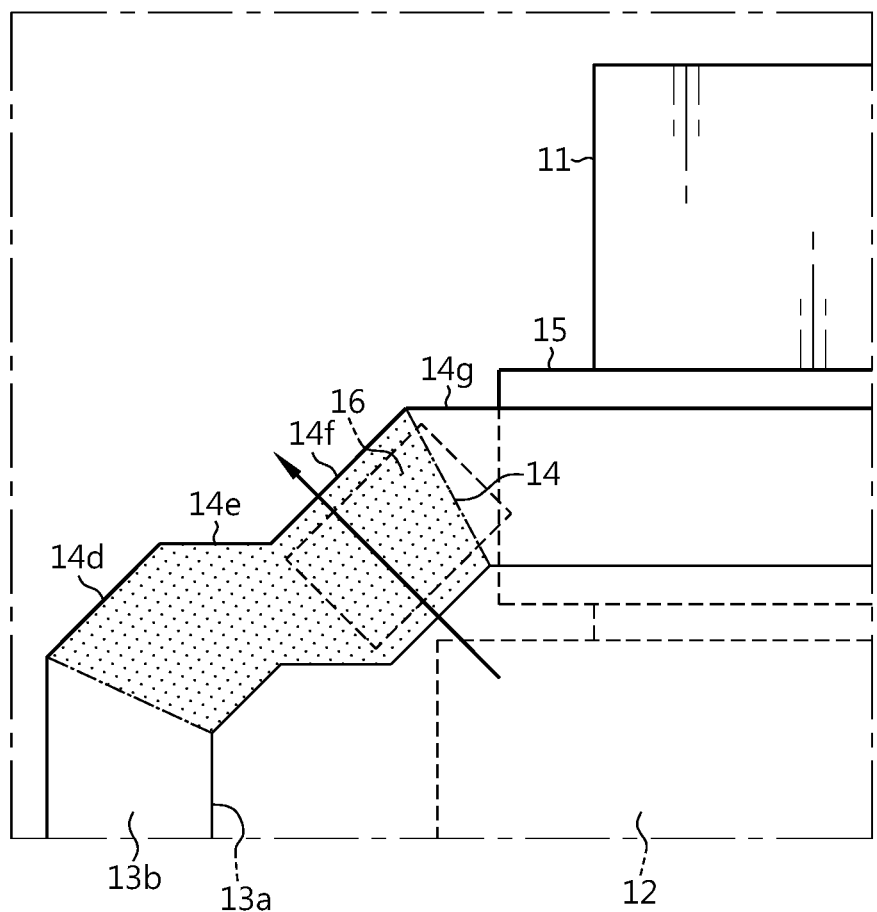
FIG. 8 is a partially enlarged plan view showing an inclined sealing portion in a secondary battery according to another embodiment of the present disclosure.

Referring to FIG. 8, the inclined sealing portion may define an octagonal region or multiple quadrilateral regions formed by connecting ends of a linear sealing line inclined at the outer side of the sealing portion and ends of a linear sealing line inclined at the inner side of the sealing portion.

Specifically, in a region where the outer sealing line may include a first inclined portion 14*d* extending from the end of the sealing portion 13*b* toward the electrode lead 11, a first linear portion 14*e* extending from the first inclined portion 14*d* and orthogonal to the first direction, a second inclined portion 14*f* extending from the first linear portion 14*e* and inclined toward the electrode lead 11, and a second linear portion 14*g* extending from the second inclined portion 14*f* and extending to one end of the case 13 in contact with the lead film 15, a region formed by connecting one side end of the first inclined portion 14*d* and the other side end of the second inclined portion 14*f* respectively to one side end of the inclined portion extending from the sealing portion 13*b* in the inner sealing line and inclined toward the electrode lead 11 and the other side end of the inner sealing line extending from the inner sealing line overlapped with the lead film 15 and extending toward the sealing portion 13*b* may be referred to as the inclined sealing portion.

Referring to FIG. 8, a vent may occur in a direction perpendicular to the inclination angles of the first inclined portion 14*d* and/or the second inclined portion 14*f*.

The inclination angles of the first inclined portion 14*d* and the second inclined portion 14*f* may be the same or different.

The first inclined portion 14*d* and/or the second inclined portion 14*f* may have an inclination angle of 10° to 80°, or 20° to 60°, or 40° to 50°. When the inclination angle of the inclined sealing portion satisfies the above-mentioned range, the gas may be more easily induced to be discharged in a direction that can minimize direct contact with the electrode lead.

In another embodiment of the present disclosure, the outer and inner sealing lines of the inclined sealing portion 14 may have one or more curves.

Referring to FIG. 9, curved outer and inner sealing lines define a curved sealing portion 14 having a convex shape toward the outside of the case 13. That is, the curved sealing portion 14 may refer to a region formed by connecting ends of a sealing line of an outer curve of the sealing portion and ends of a sealing line of an inner curve of the sealing portion.

Referring to FIG. 10, curved outer and inner sealing lines define a curved sealing portion 14 having a concave or recessed shape toward the inside of the case 13. That is, the curved sealing portion 14 may refer to a region formed by connecting ends of a sealing line of an outer curve of the sealing portion and ends of a sealing line of an inner curve of the sealing portion.

In another embodiment of the present disclosure, the outer and inner sealing lines of a curved sealing portion 14 may have two or more consecutive curves. In this case, the two or more curves may have different radii of curvature.

In another embodiment of the present disclosure, the outer and inner sealing lines of the inclined sealing portion 14 may have one or more straight lines and one or more curves.

In an embodiment of the present disclosure, the vent member 16 may be vented at 100° C. to 120° C. by allowing the gases in accommodation portion 13a to exit outside the secondary battery through vent member 16.

Since at least a part of the vent member 16 overlaps or disposed in the inclined sealing portion 14, venting may occur at a lower pressure, compared to the case of a conventional secondary battery including a sealing portion without an inclined, quadrilateral or curved sealing portions. For example, the vent member 16 may be vented at 100° C. to 120° C. and at a pressure of 0.7 atm or more.

As the vent member 16 is vented in the aforementioned temperature range and/or the aforementioned pressure condition, it is easier to seal the battery during normal operation of the battery and to induce the gas to be discharged only during abnormal operation of the battery.

Figure 11:
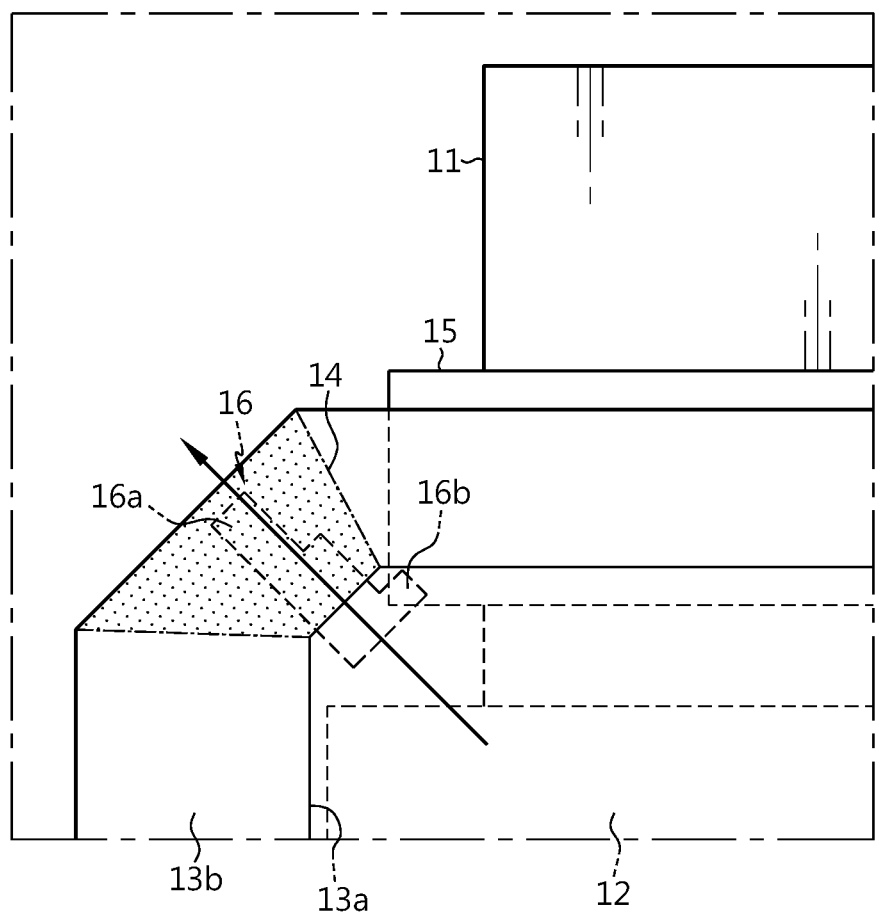
FIG. 11 is a partially enlarged plan view showing a vent member in a secondary battery according to another embodiment of the present disclosure.

Referring to FIG. 11, the vent member 16 may have a structure with a variable width that decreases in a direction perpendicular to second direction of the inclined sealing portion 14. The width of the vent member 16 may be narrowed continuously or discontinuously along the a direction perpendicular to second direction of the inclined sealing portion 14. This allows the vented gas to be directed and expelled further away from the electrode lead 11—thereby further improving the safety of the battery.

In an embodiment of the present disclosure, the vent member 16 may have a circular, oval, stepped, triangular, or quadrilateral shape.

In an embodiment of the present disclosure, the vent member 16 may be an asymmetric stepped structure as shown in FIG. 11. In the asymmetric stepped structure, an offset between the steps may be formed such that the direct contact between the vented gas and the electrode lead can be minimized. For example, the size (exhaust angle of vented gases) and location (distance from electrode lead 11) of a discharge end of vent member 16 may be configured to minimize contact of the vented gases with electrode lead as best shown in FIG. 11. Thus, reducing the size of the discharge end of the vent member to direct gases away from electrode lead 11 and locating the discharge end away from the electrode lead will minimize any contact between the vented gases and the electrode lead. In this case, the direction of the expelled vented gas may be further separated from the side portion of the electrode lead 11.

In an embodiment of the present disclosure, a thickness of the vent member 16 may decrease continuously or discontinuously along a direction perpendicular to the second direction of the inclined sealing portion 14.

Figure 12A:
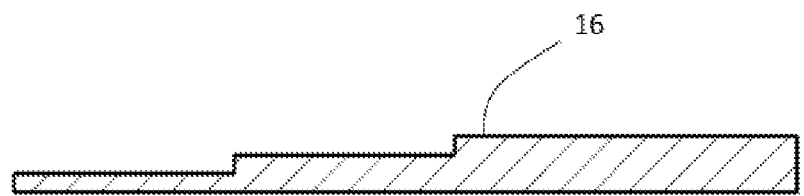
FIG. 12A is a sectional view taken along a line A-A' of a vent member of FIG. 2 according to an embodiment of the present disclosure.
Figure 12B:
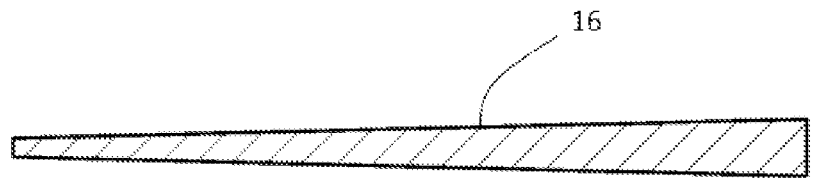
FIG. 12B is a sectional view taken along the line A-A' of a vent member of FIG. 2 according to another embodiment of the present disclosure.

FIGS. 12A and 12B are side sectional views, taken along the line A-A' of FIG. 2. A thickness of the vent member 16 may be reduced discontinuously in a stepped shape as shown in FIG. 12A, or may be reduced continuously as shown in FIG. 12B.

In an embodiment of the present disclosure, the vent resin having a lower melting point than the sealant resin may contain linear low-density polyethylene having a comonomer with a carbon number of 6 or more.

As the vent resin having a lower melting point than the sealant resin contains linear low-density polyethylene having a comonomer with a carbon number of 6 or more, excellent fusion with the sealant resin may be secured in the normal temperature range, and the sealing strength of the sealing portion including the vent member 16 may be lowered at high temperatures to realize vent characteristics.

In an embodiment of the present disclosure, the vent resin having a lower melting point than the sealant resin may contain linear low-density polyethylene having a comonomer with a carbon number of 6 to 8.

In an embodiment of the present disclosure, the vent resin having a lower melting point than the sealant resin may have a melting point of 100° C. to 130° C., or 105° C. to 125° C., or 110° C. to 120° C. If the melting point of the vent resin having a lower melting point than the sealant resin satisfies the above-mentioned range, the sealing strength of the sealing portion including the vent member 16 may be lowered at a high temperature, for example 100° C. or higher, so that the vent characteristic may be implemented more easily.

The melting point of the vent resin having a lower melting point than the sealant resin may be measured using a differential scanning calorimeter (DSC). For example, the temperature of a sample is increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the melting point may be measured by maintaining the temperature at 280° C. for 10 minutes.

In an embodiment of the present disclosure, the vent member may have a maximum sealing strength of less than 6 kgf/15 mm or less than 5 kgf/15 mm or less than 4.5 kgf/15 mm at 100° C. or higher. In an embodiment of the present disclosure, the vent member 15 may have a maximum sealing strength of less than 6 kgf/15 mm or less than 5 kgf/15 mm or less than 4.5 kgf/15 mm at 100° C. to 120° C. In an embodiment of the present disclosure, the vent member 15 may have a maximum sealing strength of less than 3 kgf/15 mm or less than 2 kgf/15 mm or less than 1 kgf/15 mm or less than 0.5 kgf/15 mm at 120° C. or higher. If the vent member satisfies the above-mentioned sealing strength in the above-mentioned temperature range, the sealing strength of the sealing portion including the vent member 16 may be lowered at a high temperature, for example 100° C. or higher, so that the vent characteristic may be implemented more easily.

In addition, in an embodiment of the present disclosure, the vent member may have a maximum sealing strength of 6 kgf/15 mm or more or 8 kgf/15 mm or more or 10 kgf/15 mm or more at room temperature to 60° C. If the vent member satisfies the above-mentioned sealing strength in the above temperature range, excellent sealing strength may be secured during normal operation of the battery, which may easily secure the sealing property of the battery.

In an embodiment of the present disclosure, the vent member may have a maximum sealing strength of less than 6 kgf/15 mm at 100° C. or higher, and the vent member may have a maximum sealing strength of 6 kgf/15 mm or more at room temperature to 60° C. If the vent member satisfies the sealing strength described above, the sealing strength of the sealing portion including the vent member 16 may be lowered at a high temperature, so that the vent characteristic may be implemented more easily. In addition, since excellent sealing strength is secured during normal operation of the battery, the sealing property of the battery may be easily secured.

In an embodiment of the present disclosure, the vent member may have an average sealing strength of less than 4.5 kgf/15 mm or less than 3 kgf/15 mm at 100° C. or above. In an embodiment of the present disclosure, the vent member 15 may have an average sealing strength of less than 4.5 kgf/15 mm or less than 3 kgf/15 mm at 100° C. to 120° C. In an embodiment of the present disclosure, the vent member 15 may have an average sealing strength of less than 2 kgf/15 mm or less than 1 kgf/15 mm or less than 0.5 kgf/15 mm at 120° C. or higher. If the vent member satisfies the above-mentioned sealing strength in the above-mentioned temperature range, the sealing strength of the sealing portion including the vent member 16 may be lowered at a high temperature, so that the vent characteristic may be implemented more easily.

In an embodiment of the present disclosure, the vent member may have an average sealing strength of 4.5 kgf/15 mm or more or 5 kgf/15 mm or more or 6 kgf/15 mm or more or 7 kgf/15 mm or more at room temperature to 60° C. If the vent member satisfies the above-mentioned sealing strength in the above temperature range, excellent sealing strength may be secured during normal operation of the battery, thereby easily securing the sealing property.

In an embodiment of the present disclosure, the vent member may have an average sealing strength of less than 4.5 kgf/15 mm at 100° C. or above, and the vent member may have an average sealing strength of 4.5 kgf/15 mm or more at room temperature to 60° C. If the vent member has the above-mentioned sealing strength in the above-mentioned temperature range, the sealing strength of the sealing portion including the vent member 16 may be lowered at a high temperature, so that the vent characteristic may be easily implemented. In addition, since excellent sealing strength may be secured during normal operation of the battery, the sealing property of the battery may be easily secured.

The sealing strength of the vent member according to temperature may be measured by conducting a tensile test at a speed of 5 mm/min, after cutting the part of the case in which the vent member is inserted into a width of 15 mm and a length of 5 cm and then grasping both ends thereof using a UTM jig in a state where both ends are spread to 180°.

At this time, a "maximum sealing strength" means a maximum value when the case is broken, and an "average sealing strength" means an average value when the case is stretched by 8 mm at 4.5 kgf/15 mm when the maximum sealing strength is 4.5 kgf/15 mm or more and an average value when the case is stretched by 8 mm at the maximum sealing strength when the maximum sealing strength is less than 4.5 kgf/15 mm.

In an embodiment of the present disclosure, the linear low-density polyethylene having a comonomer with a carbon number of 6 or more may be polymerized in the presence of a metallocene catalyst. If the linear low-density polyethylene having a comonomer with a carbon number of 6 or more is polymerized in the presence of a metallocene catalyst, it may be more advantageous in terms of sealing strength and properties, compared to the case where it is polymerized in the presence of a Ziegler-Natta catalyst.

In an embodiment of the present disclosure, the content of the comonomer with a carbon number of 6 or more in the linear low-density polyethylene having a comonomer with a carbon number of 6 or more may be 15 weight % or less, or 12 weight % or less, or 11.8 weight % or less, or 10 weight % or less, or 9 weight % or less, or 8 weight % or less, or 7.6 weight % or less, based on 100 weight % of the linear low-density polyethylene having a comonomer with a carbon number of 6 or more. At the same time, it may be 5 weight % or more, or 7.6 weight % or more, or 8 weight % or more, or 9.0 weight % or more, or 10 weight % or more, or 11.8 weight % or more, or 12 weight % or more. If the content of the comonomer with a carbon number of 6 or more satisfies the above-mentioned range, it may be easy to prevent a problem that the sealing strength is lowered during normal operation of the battery due to a decreased packing density between molecules.

The content of the comonomer with a carbon number of 6 or more may be measured using an H-NMR. For example, after about 10 mg of a sample is completely dissolved in about 0.6 mL of trichloroethylene solvent using a heat gun, it may be sampled in an NMR tube and measured using the 1H-NMR or 13C-NMR analysis method.

In an embodiment of the present disclosure, the resin having a lower melting point than the sealant resin may have a weight-average molecular weight of 100,000 g/mol to 400,000 g/mol, or 200,000 g/mol to 350,000 g/mol, or 230,000 g/mol to 300,000 g/mol. If the resin having a lower melting point than the sealant resin satisfies the above-described range, the sealing strength with the sealant resin may be more excellent during normal operation of the battery.

In an embodiment of the present disclosure, the resin having a lower melting point than the sealant resin may have a poly dispersity index (PDI) of 4 or less, or 3.8 or less, or 3.796 or less, or 3.5 or less, or 3.023 or less, or 3 or less, or 2.7 or less, or 2.674 or less. In addition, the poly dispersity index (PDI) may be 1.0 or more. If the resin having a lower melting point than the sealant resin satisfies the above range, the molecular weight distribution is narrow, so the sealing strength with the sealant resin and the properties may be superior during normal operation of the battery.

The weight-average molecular weight and the poly dispersity index of the vent resin having a lower melting point than the sealant resin may be measured by gel permeation chromatography (GPC) under the following conditions:
  column: Tosoh, HLC-8321 GPC/HT
  solvent: TCB (Trichlorobenzene)+0.04% BHT (after drying with 0.1% $CaCl_2$)
  flow velocity: 1.0 ml/min
  sample concentration: 1.5 mg/ml
  dose: 300 μl
  column temperature: 160° C.
  Detector: RI detector
  Standard: Polystyrene (calibrated with a third-order function)

In an embodiment of the present disclosure, the crystallization temperature of the sealant resin and the crystallization temperature of the vent resin having a lower melting point than the sealant resin may be similar. For example, the difference between the crystallization temperature of the sealant resin and the crystallization temperature of the vent resin having a lower melting point than the sealant resin may be 10° C. or less, or 5° C. or less. In addition, the difference between the crystallization temperature of the sealant resin and the crystallization temperature of the vent resin having a lower melting point than the sealant resin may be 0.1° C. or more. If the difference between the crystallization temperature of the sealant resin and the crystallization temperature of the vent resin having a lower melting point than the sealant resin satisfies the above range, the sealant resin and the vent resin having a lower melting point than the sealant resin may have improved fusion characteristics during normal operation of the battery.

In an embodiment of the present disclosure, the vent resin having a lower melting point than the sealant resin may have a crystallization temperature of 90° C. to 115° C., or 95° C. to 110° C., or 100° C. to 110° C., or 105° C. to 110° C. If the crystallization temperature of the vent resin having a lower melting point than the sealant resin satisfies the above range, the sealant resin and the vent resin having a lower melting point than the sealant resin may have more excellent fusion characteristics.

The crystallization temperature may be measured using a differential scanning calorimeter (DSC). For example, the temperature of the sample may be increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the crystallization temperature may be measured by maintaining the temperature at 280° C. for 10 minutes.

In an embodiment of the present disclosure, the vent member 16 may have a thickness of a film. The vent member 16 may be formed to have a predetermined thickness of a preset size. In addition, the vent member 16 may be inserted into the inclined sealing portion, quadrilateral sealing portion or curve sealing portion 14 so that its insertion length may be varied or its venting pressure and position may be controlled depending on the design.

In an embodiment of the present disclosure, the vent member 16 may further include an adhesive layer for improved sealing between the sealant resin and the vent resin having a lower melting point than the sealant resin.

Since the secondary battery according to an embodiment of the present disclosure includes a partially overlapping inclined, quadrilateral, or curved sealing portion at the corner of the sealing portion with the vent member containing the vent resin, directional venting for discharging gas in one direction by lowering the sealing strength at high temperature may be implemented more readily and efficiently.

In an embodiment of the present disclosure, the case 13 may be in a pouch form.

In an embodiment of the present disclosure, when the battery case 13 is in the form of a pouch, the battery case 13 may include an upper pouch and a lower pouch. When the battery case 13 includes an upper pouch and a lower pouch, after the upper pouch and the lower pouch are disposed so that the sealant resins thereof face each other, the facing sealant resins are fused with each other by heat and pressure to seal the battery.

The fusion may be thermal fusion, ultrasonic fusion, or the like to fuse the sealing portion.

The sealing portion 13b may be sealed on four sides or sealed on three sides of the battery case. When the case 13 has a three-sided sealing structure, after the upper pouch and the lower pouch are formed on one pouch sheet, the boundary surface between the upper pouch and the lower pouch is bent so that the electrode assembly accommodation portions 13a formed on the upper pouch and the lower pouch are overlapped, and in this state, the edges of the remaining three sides are sealed except for the bending portion.

In an embodiment of the present disclosure, the inclined sealing portion, the quadrilateral sealing portion or the curved sealing portion may be located at the corner of the sealing portion at an edge connected to the bent portion among the edges of the three sealed sides.

In an embodiment of the present disclosure, the case 13 may be provided in a film form having a multilayer structure including an outer layer for protection against external impacts, a metal barrier layer for blocking moisture, and a sealant layer for sealing the case.

The outer layer may include a polyester-based film using polyethylene terephthalate (PET), polybutylene terephthalate, polyethylene naphthalate, polybutylene naphthalate, co-polyester, polycarbonate, nylon, or the like, and may be configured in a single layer or multiple layers.

The metal barrier layer may include aluminum, copper, or the like.

The sealant layer may be configured in a single layer or multiple layers.

The sealant resin may include polypropylene (PP), acid-modified polypropylene (PPa), random polypropylene, ethylene propylene copolymer, or two or more thereof. The ethylene propylene copolymer may include, but is not limited to, ethylene-propylene rubber, ethylene-propylene block copolymer, and the like.

In an embodiment of the present disclosure, the secondary battery may be a cylindrical, prismatic, or pouch-type secondary battery. Among them, the secondary battery may be a pouch-type secondary battery.

Even though preferred embodiments of the present disclosure has been illustrated and described above, the present disclosure is not limited to the specific embodiments described above, and the present disclosure can be modified in various ways by those skilled in the art without departing from the gist of the present disclosure defined in the claims, and these modifications should not be individually understood from the technical idea or prospect of the present disclosure.

The invention claimed is:

1. A secondary battery, comprising:
an electrode assembly;
a case including an accommodation portion to receive the electrode assembly and a sealing portion to seal the electrode assembly therein, the sealing portion including a sealant resin to form a seal around the electrode assembly;
an electrode lead attached to the electrode assembly, the electrode lead extending away from the case along a first direction,
wherein the sealing portion includes an inclined sealing portion adjacent the electrode lead, the inclined sealing portion extending along a second direction, the second direction being non-orthogonal to the first direction,
a vent member disposed in the inclined sealing portion, the vent member including a vent resin having a lower melting point than the sealant resin, and
a lead film surrounding an outer surface of the electrode lead, the lead film being interposed between the electrode lead and the sealing portion, the vent member extending through the accommodation portion such that the vent member at least partially overlaps or contacts the lead film in the accommodation portion.

2. The secondary battery according to claim 1, wherein the inclined sealing portion has an inclination angle of 10° to 80°, the inclination angle being defined as an angle between the first direction and the second direction.

3. The secondary battery according to claim 1, wherein the vent member includes a first side extending parallel to the second direction.

4. The secondary battery according to claim 3, wherein a vent forms along a direction perpendicular to the first side of the vent member.

5. The secondary battery according to claim 1, wherein the vent member includes a first portion and a second portion,
the first portion extending along the second direction such that the first portion may at least partially overlap or contact the lead film in the accommodation portion,
the second portion extending along a third direction orthogonal to the second direction.

6. The secondary battery according to claim 5, wherein the vent member defines an L shape.

7. The secondary battery according to claim 5, wherein the second portion includes a tapered edge that extends into the accommodation portion along the electrode assembly.

8. The secondary battery according to claim 5, wherein an outer end of the first portion is spaced apart from a inner end of the sealing portion adjacent the lead film, the outer end of the first portion being located in the accommodation portion.

9. The secondary battery according to claim 5, wherein the second portion does not overlap or contact the lead film.

10. The secondary battery according to claim 1, wherein a width of the vent member varies in a direction perpendicular to the second direction.

11. The secondary battery according to claim 1, wherein the vent member defines any of a circular, oval, stepped, triangular and quadrilateral shape.

12. The secondary battery according to claim 1, wherein a thickness of the vent member varies in a direction perpendicular to the second direction.

13. The secondary battery according to claim 1, wherein an area of a region of the vent member overlapping or contacting the lead film is 1% to 30% of an area of a region of the lead film not contacting or overlapping the electrode lead.

14. The secondary battery according to claim 1, wherein the vent resin includes a linear low-density polyethylene having a comonomer with a carbon number of 6 or more.

15. The secondary battery according to claim 1, wherein the vent member melts at 100° C. to 120° C. to vent gases from the accommodation portion to an exterior of the secondary battery.

16. The secondary battery according to claim 15, wherein the vent member vents gases from the accommodation portion when the accommodation portion is at a pressure of 0.7 atm or above.

17. The secondary battery according to claim 1, wherein the vent member has a maximum sealing strength of less than 6 kgf/15 mm at 100° C. or above.

18. The secondary battery according to claim 1, wherein the vent member has an average sealing strength of less than 4.5 kgf/15 mm at 100° C. or above.

19. The secondary battery according to claim 1, wherein the vent member has a maximum sealing strength of 6 kgf/15 mm or more at room temperature to 60° C.

20. The secondary battery according to claim 1, wherein the vent member has an average sealing strength of 4.5 kgf/15 mm or more at room temperature to 60° C.

21. The secondary battery according to claim 14, wherein the linear low-density polyethylene is polymerized in the presence of a metallocene catalyst.

22. The secondary battery according to claim 14, wherein a content of the comonomer with a carbon number of 6 or more is 15 weight % or less based on 100 weight % of the linear low-density polyethylene.

23. The secondary battery according to claim 1, wherein the vent resin has a poly dispersity index (PDI) of 4 or less.

24. The secondary battery according to claim 1, wherein a difference between a crystallization temperature of the sealant resin and a crystallization temperature of the vent resin is 10° C. or less.

25. The secondary battery according to claim 1, wherein the vent resin has a melting point of 100° C. to 130° C.

26. The secondary battery according to claim 1, wherein the vent resin has a weight-average molecular weight of 100,000 g/mol to 400,000 g/mol.

27. The secondary battery according to claim 1, wherein the secondary battery is a pouch-type secondary battery.

28. The secondary battery according to claim 1, wherein the vent member has a maximum sealing strength of less than 6 kgf/15 mm at 100° C. to 120° C.

29. The secondary battery according to claim 1, wherein the vent member has an average sealing strength of less than 4.5 kgf/15 mm at 100° C. to 120° C.

30. The secondary battery according to claim 14, wherein a content of the comonomer with the carbon number of 6 or more is from 5 weight % to 15 weight % based on 100 weight % of the linear low-density polyethylene.

31. The secondary battery according to claim 1, wherein the vent member has a maximum sealing strength of less than 3 kgf/15 mm at 120° C. or more.

32. The secondary battery according to claim 1, wherein the vent member has an average sealing strength of less than 2 kgf/15 mm at 120° C. or more.

33. A secondary battery, comprising:
an electrode assembly;
a case including an accommodation portion to receive the electrode assembly and a sealing portion to seal the electrode assembly therein, the sealing portion including a sealant resin to form a seal around the electrode assembly;
an electrode lead attached to the electrode assembly, the electrode lead extending away from the case along a first direction,
wherein the sealing portion includes a convex sealing portion adjacent the electrode lead, the convex sealing portion extending along a convex curve from the first direction to a second direction, the second direction being orthogonal to the first direction,
a vent member disposed in the convex sealing portion, the vent member including a vent resin having a lower melting point than the sealant resin, and
a lead film surrounding an outer surface of the electrode lead, the lead film being interposed between the electrode lead and the sealing portion, the vent member extending through the accommodation portion such that the vent member at least partially overlaps or contacts the lead film in the accommodation portion.

34. A secondary battery, comprising:
an electrode assembly;
a case including an accommodation portion to receive the electrode assembly and a sealing portion to seal the electrode assembly therein, the sealing portion including a sealant resin to form a seal around the electrode assembly;
an electrode lead attached to the electrode assembly, the electrode lead extending away from the case along a first direction,
wherein the sealing portion includes a concave sealing portion adjacent the electrode lead, the concave sealing portion extending along a concave curve from a second direction toward the first direction, the second direction being orthogonal to the first direction, a vent member disposed in the concave sealing portion, the vent member including a vent resin having a lower melting point than the sealant resin, and a lead film surrounding an outer surface of the electrode lead, the lead film being interposed between the electrode lead and the sealing portion, the vent member extending through the accommodation portion such that the vent member at least partially overlaps or contacts the lead film in the accommodation portion.

* * * * *